United States Patent Office.

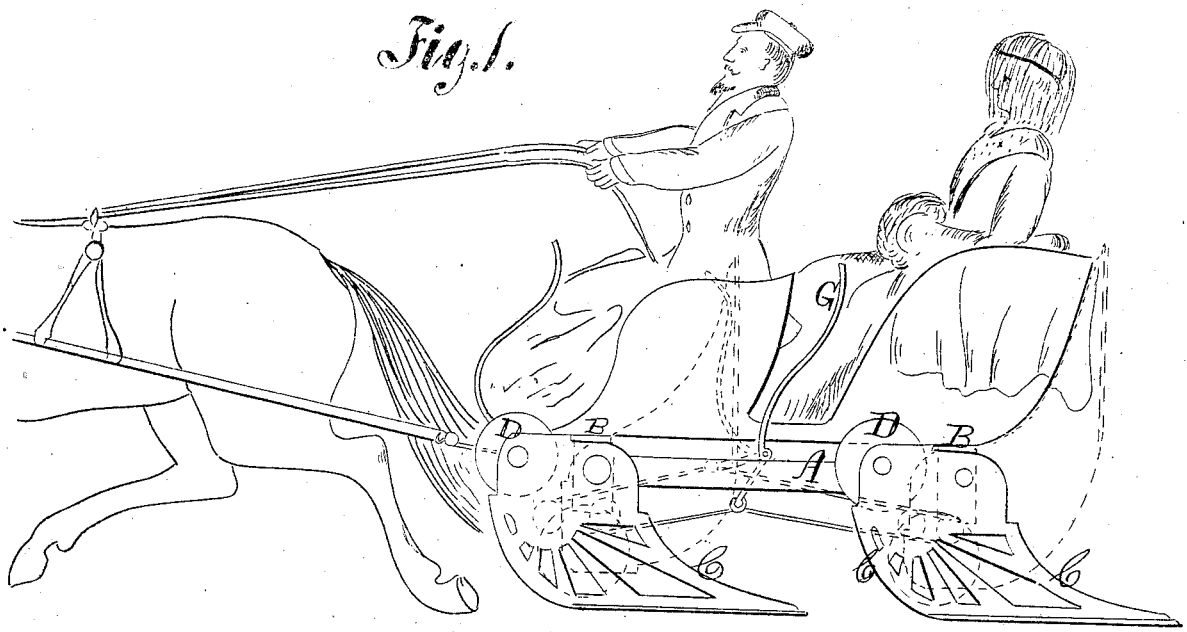
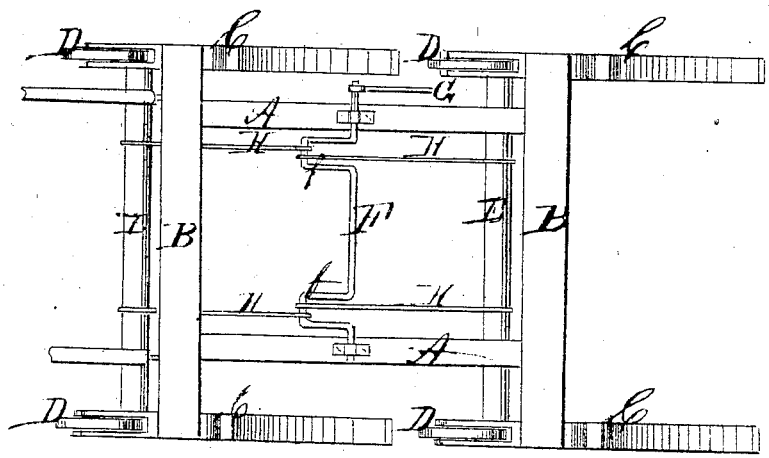

DAVID C. FRAZEUR, OF SIDONSBURG, PENNSYLVANIA

Letters Patent No. 73,885, dated January 28, 1868.

IMPROVEMENT IN SLEIGHS AND SLEDS.

*The Schedule referred to in these Letters Patent and making part of the same.*

TO ALL WHOM IT MAY CONCERN:

Be it known that I, DAVID C. FRAZEUR, of Sidonsburg, in the county of York, and State of Pennsylvania, have invented a new and useful Improvement in Sleighs, Sleds, &c.; and I do hereby declare the following to be a full, clear, and exact description of the same, sufficient to enable those skilled in the art to which my invention appertains to make use of it, reference being had to the accompanying drawings, forming part of this specification, in which—

Figure 1 is a side view.
Figure 2 is a top view.

In this invention the runner is used in connection with a wheel, the two being so arranged and operated that when desired, the vehicle may be supported upon the runners, or, by simply moving a hand-lever, may be thrown upon the wheels, so that it can be instantly adjusted to travel upon snow or upon the bare ground.

In the drawings, A A represent the frame or body of the vehicle, supported upon two axles B B. C C are short, high sled-runners, two on each side of the carriage, pivoted at their rear upper corner upon the axles B B. At their forward upper corner a deep recess is cut in each one, in which runs a wheel or truck, D D, in the manner shown in the drawings. The two sled-runners attached to each axle are united by a strong cross-bar, E E, running across under and a little forward of the axle. F is a shaft, having one or more double cranks $ff$, and operated by a lever, G. From the cranks $ff$, run one or more pitmen, H H, to the cross-bars E E.

In a vehicle thus constructed, if the lever G be thrown back, the carriage is made to run on the runners C C, as shown in dark lines in fig. 1. But if the latter be thrown forward, the pitmen draw the runners back, and cause them to partially rotate upon their axles until they reach a vertical position, as seen in red lines in the same figure, and the carriage rests upon the wheels D D. The carriage may thus be adjusted to run either upon runners or wheels, and may be changed from one to the other by the driver or occupant, by merely throwing the lever G backward or forward.

Having thus described my invention, what I claim as new, and desire to secure by Letters Patent, is—

1. The combination and arrangement of the wheels D D and runners C C, substantially as and for the purposes specified.

2. The combination of the lever G, shaft F, pitmen H H, and cross-bars E E, with the pivoted runners C C, bearing the wheels D D, substantially in the manner and for the purposes set forth.

DAVID C. FRAZEUR.

Witnesses:
DANIEL KAUFMAN,
GEO. LEILY.